Patented Dec. 9, 1952

2,621,186

UNITED STATES PATENT OFFICE 2,621,186

PROCESS FOR THE MANUFACTURE OF 5-KETO - 1:3:4:5 - TETRAHYDROBENZ-(CD)-INDOL

Cyril Grob, Basel, Switzerland, assignor to Haco-Gesellschaft A. G., Gumligen (Ct. Berne), Switzerland, a Swiss company No Drawing. Application September 6, 1950, Serial No. 183,471. In Switzerland April 3, 1950

6 Claims. (Cl. 260—319)

5-keto-1:3:4:5-tetrahydrobenz-(cd)-indol is a valuable intermediate product useful for the manufacture of lysergic acid and for compounds related with lysergic acid. At present the said compound is made by a non-economical, but expensive method (cf. F. C. Uhle, J. Am. Chem. Soc. 71, 761-766 (1949)).

I have now found a new and economical method for the production of 5-keto-1:3:4:5-tetrahydrobenz-(cd)-indol, according to which the said compound may be obtained in a good yield and in a pure condition.

The main object of the present invention, therefore, is the embodiment of a new method for the preparation of 5-keto-1:3:4:5-tetrahydrobenz-(cd)-indol. This object is realized according to this invention by a process which consists in a rearrangement of 5-hydroxy-benz-(cd)-indoline to produce the 5-keto-1:3:4:5-tetrahydrobenz-(cd)-indol according to the following equation:

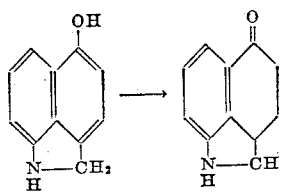

The reaction may be carried out according to the present invention in a very simple way by heating the indoline derivative preferably in the presence of solvents or diluents and, if desired, in the presence of a catalyst. Suitable solvents, which may be used in accordance with the invention, are for instance benzene, toluene, tetraline and decaline. As catalysts which are suitable for carrying out the method of the invention, use may be made of substances known for the transposition of hydrogen, such as for example platinum, palladium, nickel, cobalt and nickel chromite.

The 5-hydroxy-benz-(cd)-indoline used as starting agent in accordance with the present invention is a new compound and can be prepared according to the method of my copending application Ser. No. 183,472, filed September 6, 1950, from 1-methoxy-5-acetylamino-naphthalene by the following reactions:

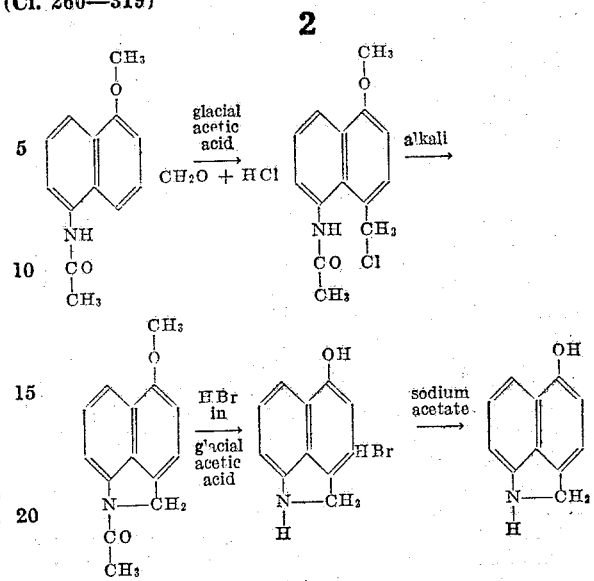

The 5 - keto - 1:3:4:5-tetrahydro-benz-(cd)-indol is a useful intermediate for the preparation of medicines.

The present invention is illustrated by the following examples without being limitative. The parts are by weight, unless otherwise stated, and the temperatures are in degrees centigrade.

Example 1

260 parts of 5-hydroxy-benz-(cd)-indoline are boiled under reflux together with a large quantity of xylene and 200 parts of 10% palladium-carbon catalyst, the boiling being continued for 40–50 hours. The solution, while still hot, is filtered in order to remove the catalyst, then extracted several times with n-hydrochloric acid and subsequently washed with water. The xylene solution is evaporated in a vacuo, whereup there is obtained a crystalline residue which is contaminated with a small quantity of an oily by-product. The residue can be purified by chromatographic absorption with aluminum oxide or by sublimation in a high vacuo. In this way there are obtained 110–120 parts of 5-keto-1:3:4:5-tetrahydro-benz-(cd)-indol having the melting point of 162–164°.

If desired, it is possible to recover in an easy way some pure starting material from the hydrochloric acid extracts which may be used for a new reaction cycle.

Example 2

2.5 parts of 5-hydroxy-benz-(cd)-indoline are mixed while stirring in 1600 parts by volume of tetraline with 3 parts of a catalyst consisting of palladium and carbon in a nitrogen atmosphere and the whole heated for 5 hours at 190–195°. Then the reaction product is worked up in the same manner as described in Example 1. In this way one obtains 1.3 parts of 5-keto-1:3:4:5-tetrahydro-benz-(cd)-indol and 1 part of unchanged starting material.

Instead of palladium and carbon it is also possible to use Raney nickel as catalyst. If the interaction is carried out in the absence of any catalyst, the conversion of the 5-hydroxy-benz-(cd)-indoline into 5-keto-1:3:4:5-tetrahydro-benz-(cd)-indol will require a much longer time.

Example 3

4 parts of finely powdered 5-hydroxy-benz-(cd)-indoline are introduced into the shell of a Soxhlet apparatus. Then 4 parts of 10% palladium-carbon, 200 parts by volume of tetraline and 100 parts by volume of xylene are added to the vessel destined for containing the solvent. The xylene is caused to evaporate by heating in an oil bath at a temperature ranging from 180° to 190°, whereby the 5-hydroxy-benz-(cd)-indoline is gradually extracted. After about 3 hours the extraction will be complete. The heating is continued for still further 3–4 hours under reflux whereupon the solution is filtered still hot and freed from non-reacted base by extraction with 1-n-hydrochloric acid. By evaporation of the solution consisting of tetraline and xylene in a vacuo there is obtained a residue from which there is obtained the 5-keto-1:3:4:5-tetrahydro-benz-(cd)-indol in a yield of 87% which, after recrystallisation from benzene, melts at 162–164°.

What I claim is:

1. A method for the production of 5-keto-1:3:4:5-tetrahydro-benz-(cd)-indol, comprising the step of converting 5-hydroxy-benz-(cd)-indoline into its keto compound by heating the 5-hydroxy-benz-(cd)-indoline in a hydrocarbon solvent until rearrangement into the indol has taken place.

2. A method for the production of 5-keto-1:3:4:5-tetrahydro-benz-(cd)-indol, comprising the step of converting 5-hydroxy-benz-(cd)-indoline into its keto compound by heating the 5-hydroxy-benz-(cd)-indoline in a hydrocarbon solvent and in the presence of a catalyst selected from the group consisting of palladium, nickel and platinum catalysts until rearrangement into the indol has taken place.

3. A method for the production of 5-keto-1:3:4:5-tetrahydro-benz-(cd)-indol, comprising the step of converting 5-hydroxy-benz-(cd)-indoline into its keto compound by heating the 5-hydroxy-benz-(cd)-indoline in xylene and in the presence of a catalyst selected from the group consisting of palladium, nickel and platinum catalysts until rearrangement into the indol has taken place.

4. A method for the production of 5-keto-1:3:4:5-tetrahydro-benz-(cd)-indol, comprising the step of converting 5-hydroxy-benz-(cd)-indoline into its keto compound by heating the 5-hydroxy-benz-(cd)-indoline in tetraline and in the presence of a catalyst selected from the group consisting of palladium, nickel and platinum catalysts until rearrangement into the indol has taken place.

5. A method for the production of 5-keto-1:3:4:5-tetrahydro-benz-(cd)-indol, comprising the step of converting 5-hydroxy-benz-(cd)-indoline into its keto compound by heating the 5-hydroxy-benz-(cd)-indoline in a hydrocarbon solvent and in the presence of a palladium-carbon catalyst until rearrangement into the indol has taken place.

6. A method for the production of 5-keto-1:3:4:5-tetrahydro-benz-(cd)-indol, comprising the step of converting 5-hydroxy-benz-(cd)-indoline into its keto compound by heating the 5-hydroxy-benz-(cd)-indoline in a xylene-tetraline reaction medium and in the presence of a palladium-carbon catalyst until rearrangement into the indol has taken place.

CYRIL GROB.

No references cited.